US011881981B2

(12) United States Patent
Watfa et al.

(10) Patent No.: US 11,881,981 B2
(45) Date of Patent: Jan. 23, 2024

(54) COMMUNICATION SITE POTENTIAL OUTAGE CAUSING EVENT IMPACT PREDICTION

(71) Applicant: VERIZON PATENT AND LICENSING INC., Basking Ridge, NJ (US)

(72) Inventors: Allie Khalil Watfa, Champaign, IL (US); Nilam Jyoti Sharma, Savoy, IL (US); Manikandan Murugesan, Champaign, IL (US); Rajesh Pratabrai Lalwani, Champaign, IL (US); Adabel Jasmin Marquina, Rockville, MD (US); Vinoth Kumar Rajasekar, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 187 days.

(21) Appl. No.: 17/229,343

(22) Filed: Apr. 13, 2021

(65) Prior Publication Data

US 2022/0329476 A1   Oct. 13, 2022

(51) Int. Cl.
| | |
|---|---|
| *H04L 41/16* | (2022.01) |
| *H04L 41/0631* | (2022.01) |
| *G08B 31/00* | (2006.01) |
| *G06N 20/00* | (2019.01) |
| *G01W 1/00* | (2006.01) |

(52) U.S. Cl.
CPC ............ *H04L 41/065* (2013.01); *G06N 20/00* (2019.01); *G08B 31/00* (2013.01); *G01W 1/00* (2013.01)

(58) Field of Classification Search
CPC ......... G06N 20/00; G08B 31/00; G01W 1/00; H04L 41/065; H04L 41/0654; H04L 41/0803; H04L 41/0823; H04L 41/145; H04L 41/147; H04L 41/16; H04L 69/40; Y04S 10/52
See application file for complete search history.

(56) References Cited

U.S. PATENT DOCUMENTS

| | | | | |
|---|---|---|---|---|
| 9,297,723 | B1 * | 3/2016 | Hofmann | ............... G06N 20/00 |
| 10,129,168 | B2 * | 11/2018 | Kaminski | ............... H04L 47/70 |
| 10,637,715 | B1 * | 4/2020 | Vasilyev | ............... H04L 41/065 |
| 10,826,932 | B2 * | 11/2020 | Abbaszadeh | ....... G06F 18/2163 |
| 10,965,516 | B2 * | 3/2021 | Fenoglio | ................ G06N 20/00 |
| 11,143,793 | B2 * | 10/2021 | Shafer | ..................... G01W 1/10 |
| 2019/0379592 | A1 * | 12/2019 | Samadi | ............... H04L 43/0882 |
| 2020/0234162 | A1 * | 7/2020 | Jayaraman | ............. G06N 20/00 |

* cited by examiner

*Primary Examiner* — Frank Duong (57) ABSTRACT

A method includes executing, on a processor of a computing device, instructions that cause the computing device to perform operations. The operations include executing, on a processor of a computing device, instructions that cause the computing device to perform operations. The operations include receiving site features associated with a communication site and receiving event features associated with a potential outage-causing event. A classifying engine is employed to generate an impact metric indicating an effect on the communication site from the potential outage-causing event based on the site features and the event features.

20 Claims, 8 Drawing Sheets

COMMUNICATION SITE POTENTIAL OUTAGE CAUSING EVENT IMPACT PREDICTION

BACKGROUND

Communication network infrastructure is susceptible to damage from natural events. Damage to communication sites disrupts network coverage and performance. Recovery from damaging events requires the dispatch of repair personnel to repair damaged infrastructure.

SUMMARY

In accordance with the present disclosure, one or more computing devices and/or methods are provided. In an example, a method includes executing, on a processor of a computing device, instructions that cause the computing device to perform operations. The operations include receiving site features associated with a communication site and receiving event features associated with a potential outage-causing event. A classifying engine is employed to generate an impact metric indicating an effect on the communication site from the potential outage-causing event based on the site features and the event features.

In an example, a computing device includes a processor and memory comprising processor-executable instructions that when executed by the processor cause performance of operations. The operations include receiving first candidate site features associated with a communication site, receiving second candidate site features associated with the communication site, and receiving first event features associated with a first potential outage-causing event. A classifying engine is employed to generate a first impact metric indicating an effect on the communication site from the first potential outage-causing event for the first candidate site features based on the first candidate site features and the first event features. The classifying engine is employed to generate a second impact metric indicating an effect on the communication site from the first potential outage-causing event for the second candidate site features based on the second candidate site features and the first event features.

In an example, a non-transitory machine readable medium having stored thereon processor-executable instructions that when executed cause performance of operations. The operations include receiving first site features associated with a first communication site, receiving second site features associated with a second communication site, and receiving event features associated with a potential outage-causing event. A classifying engine is employed to generate a first impact metric indicating an effect on the first communication site from the potential outage-causing event based on the first site features and the event features. The classifying engine is employed to generate a second impact metric indicating an effect on the second communication site from the potential outage-causing event based on the second site features and the event features. A map is generated indicating a first location of the first communication site overlaid with a first indicator corresponding to the first impact metric and indicating a second location of the second communication site overlaid with a second indicator corresponding to the second impact metric.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
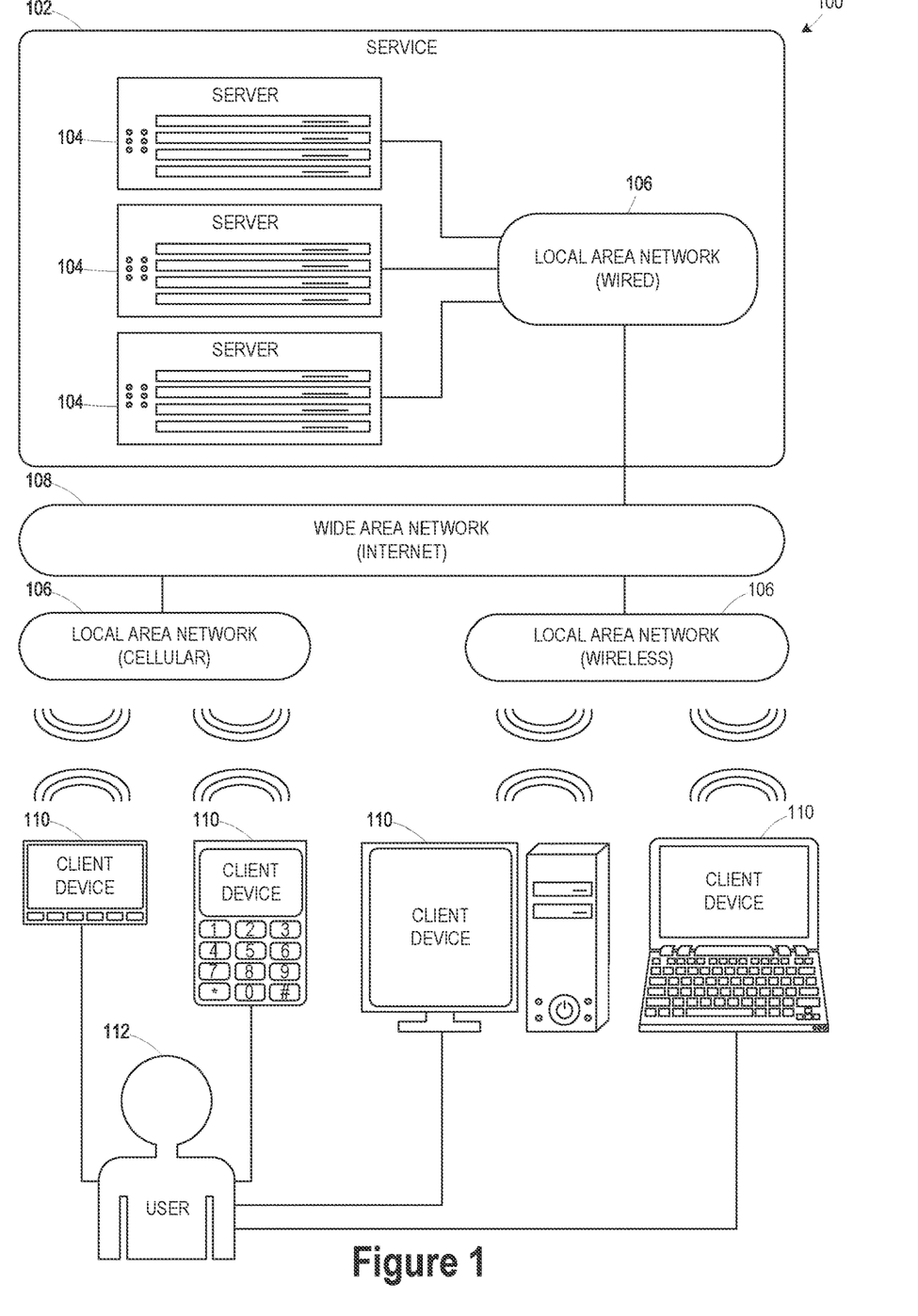
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
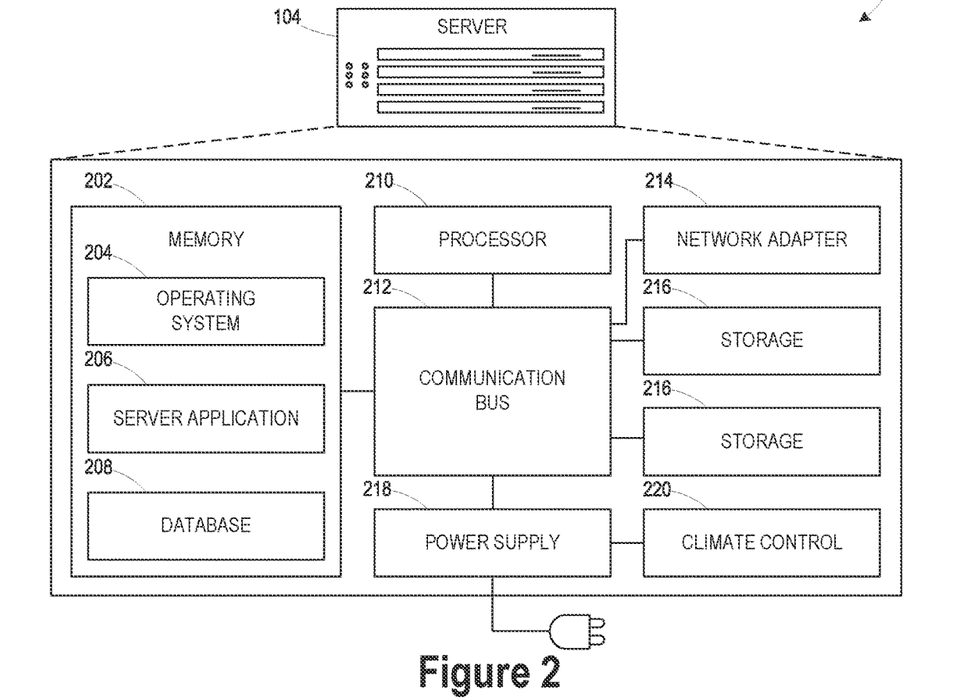
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
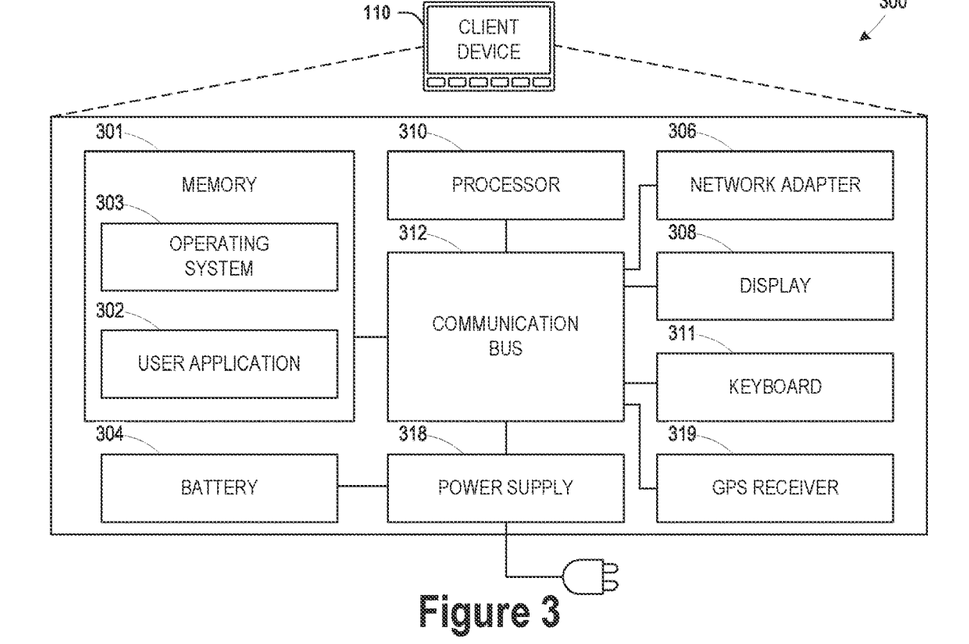
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger, internet browser, and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for predicting communication site event impact are provided. A system may use a machine learning model to perform one or more actions, such as at least one of one or more classification actions, one or more regression actions, one or more clustering actions, etc. For example, the system may use the machine learning model to output information (e.g., one or more predictions) based upon one or more inputs. The information may be used to provide one or more services (e.g., the information may be used to at least one of select content for presentation to a user, to predict event impact on a communication site, to evaluate a potential communication site design, etc.). The one or more inputs may correspond to event features and communication site features, or other suitable parameters.

In accordance with one or more of the techniques herein, a classifying engine is trained to generate an impact metric indicating an effect on a communication site from a potential outage-causing event based on site features and event features. In some embodiments, the classifying engine is used to generate event impacts for current or future potential outage-causing events. In some embodiments, the classifying engine is used to evaluate different options for a communication site design to generate a risk profile for the communication site. The prediction of event impact on a communication site allows resources to be allocated and event responses to be planned to reduce the impact of site outages on the provided communication service.

Figure 4:
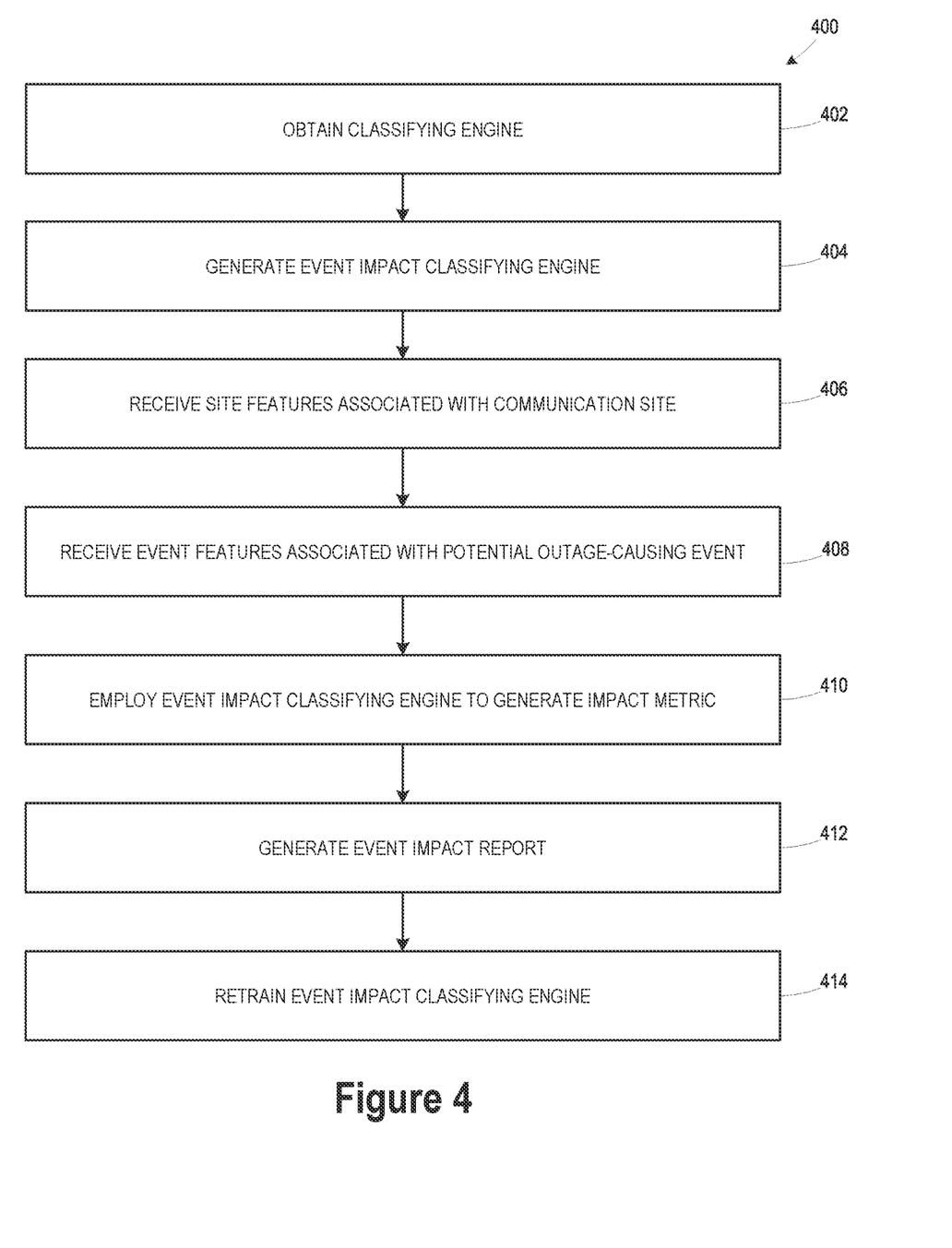
FIG. 4 is a flow chart illustrating an example method for communication site event impact prediction.

An embodiment of an example method 400 for communication site event impact prediction is illustrated in FIG. 4. A system may use one or more machine learning models to perform one or more actions, such as at least one of one or more classification actions, one or more regression actions, one or more clustering actions, etc. For example, the system may use the one or more machine learning models to output information based upon one or more inputs and/or use the information to provide one or more services.

At 402 a classifying engine is obtained and at 404 machine learning model training may be performed using training data to generate an event impact classifying engine. In some examples, the classifying engine and/or the an event impact classifying engine may comprise at least one of a neural network, a tree-based model, a machine learning model used to perform linear regression, a machine learning model used to perform logistic regression, a decision tree model, a support vector machine (SVM), a Bayesian network model, a k-Nearest Neighbors (kNN) model, a K-Means model, a random forest model, a machine learning model used to perform dimensional reduction, a machine learning model used to perform gradient boosting, etc.

Figure 5A:
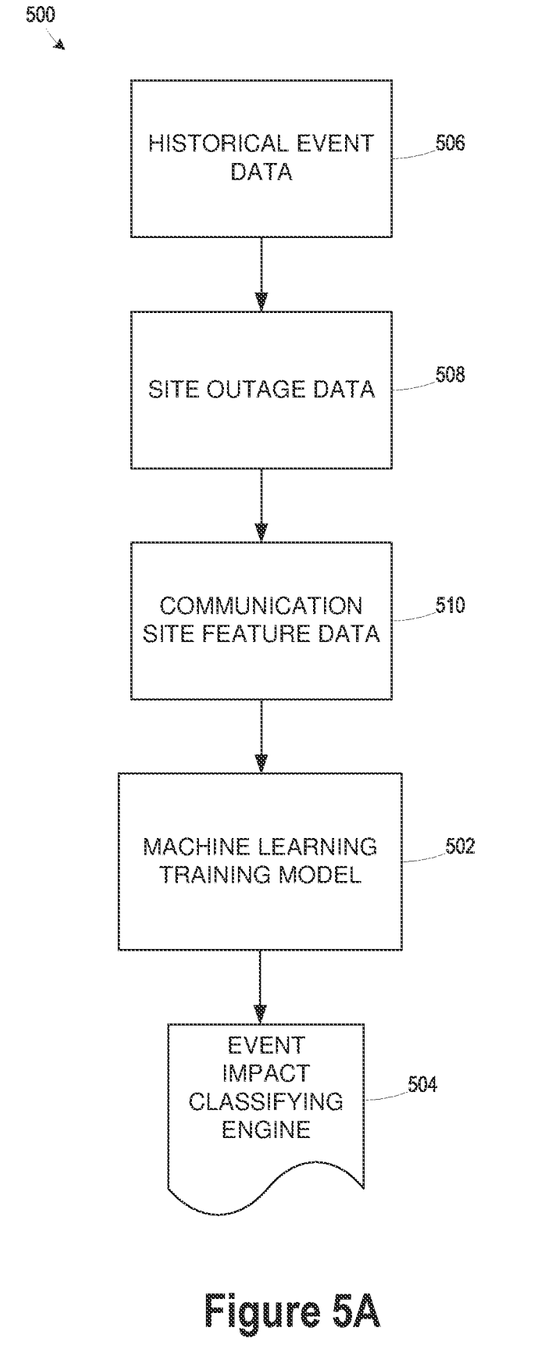
FIGS. 5A-5C are component block diagrams illustrating an example system for communication system event impact prediction.
Figure 5B:
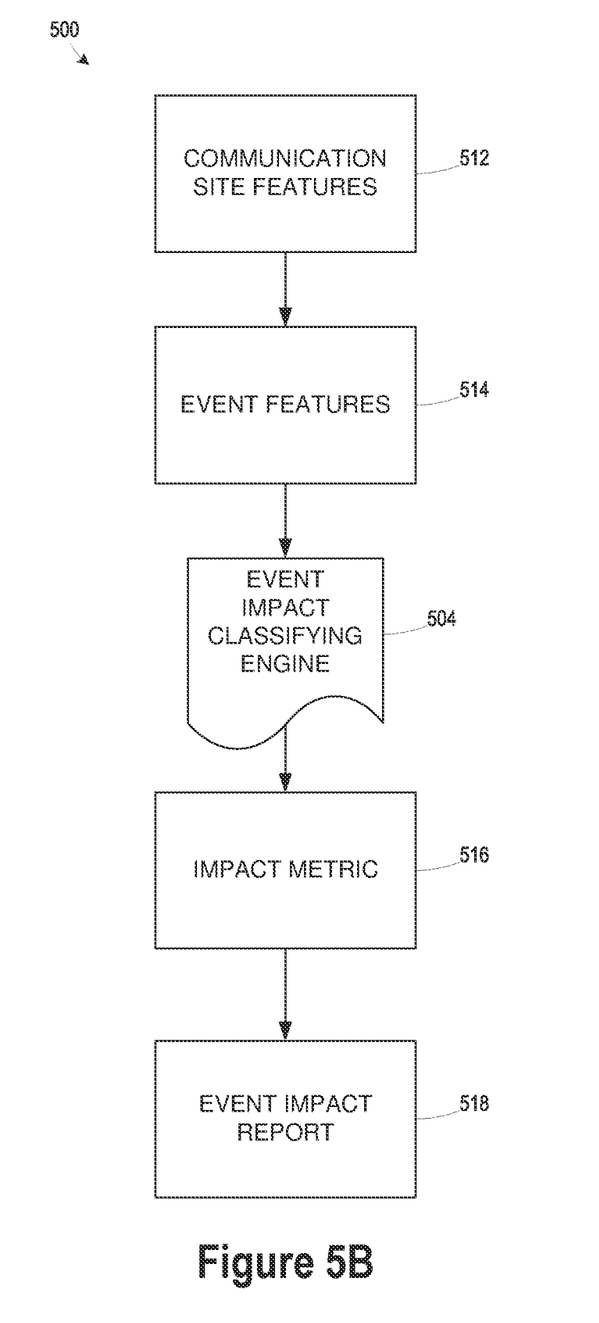
Figure 5C:
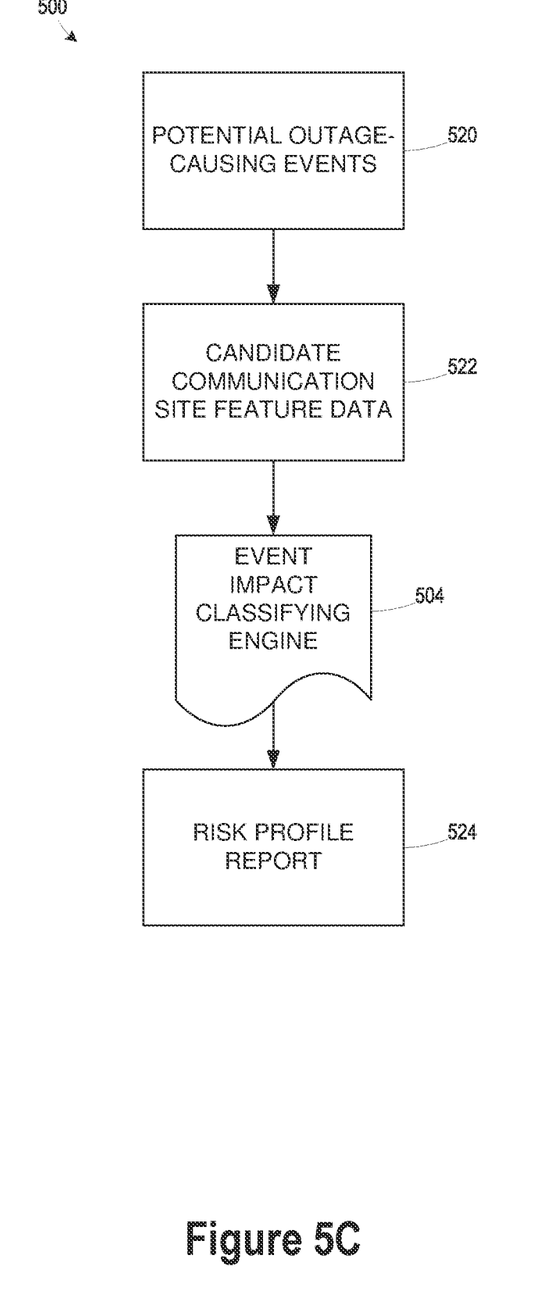

FIGS. 5A-5C illustrate examples of a system 500 for training and employing a classifying engine to predict event impact on a communication site described with respect to the method 400 of FIG. 4. FIG. 5A illustrates a machine learning training module 502 performing machine learning model training to generate an event impact classifying engine 504. In an example, training data, including historical event data 506, site outage data 508, and/or site feature data 510, may be input to the machine learning training module 502. The machine learning training module 502 may generate the event impact classifying engine 504 (e.g., train the classifying engine obtained at 402) using the historical event data 506, the site outage data 508, and/or the site feature data 510 as training data.

In some examples, the site outage data 508 represents target information (e.g., target attributes associated with the training data). For example, the target information may comprise labels associated with the training data. In some examples, the labels may be indicative of classifications associated with the training data. In some embodiments, the site outage data 508 provides a label indicating whether a particular communication site was affected by a particular potential outage-causing event included in the historical event data 506. In some embodiments, site outage data 508 comprises categorical data about impacted services per communication site. The service impact labels may include network outage, customer trouble report, truck dispatch to site, truck dispatch to customer premise, and/or other suitable impact classification. Network outage labels may include data down, telephone service down, intermittent connectivity, network devices not passing traffic, physical fiber cuts, and/or other suitable outage labels.

In some embodiments, the site outage data 508, the site outage data 508, and/or the site feature data 510 are linked by a location field to facilitate training. According to some embodiments, the location field is specified by a longitude field and/or a latitude field. During the training, an event data store including historical event data 506 associated with potential outage-causing events is linked to a site outage data store including site outage data 508 specifying communication sites experiencing outages based on the site location and the event location. The site feature data 510 provides characteristics of the individual communication sites that serve as inputs to the training to facilitate the event impact classifying engine 504 learning what types of communication sites are affected by particular types of potential outage-causing events. In some embodiments, the site feature data 510 includes features such as altitude, surveyed altitude, support structure height, support structure type, communication technology, site age, and/or other suitable site features.

Example support structure types include guyed structure, guyed tower, guyed tower with broadcast antennas, building, building with a side mounted antenna, in-building system, building with facade, building with tower, building with steeple, rooftop, building with pipe, building with pole, free-standing, self-support, pole, utility pole, utility tower, wood light pole, steel light pole, sign, billboard, dedicated pole, wood pole, concrete pole, fiberglass pole, metal pole, composite pole, unipole, monopole, stealth structure, lattice tower, transmission pole, stealth flagpole, mast, silo, tank, water tank, tree, public lighting structure, antenna tower array, pipe, stack, traffic control structure, flagpole, cellular on wheels (COW), cellular on light truck (COLT), utility, monopine stealth tower, stealth monopole (without a flag), flush mount, cupola, smoke stack, power line, kiosk, signage, antenna tower array, crown, billboard, bell tower, stadium, arena, grandstand, grandstand roof, parking deck, self-support lattice tower with broadcast antenna, stealth tower close to building, utility pole replacement, elevator, clock tower, lattice on roof, and/or other suitable support structure type. Other support structure types are within the scope of the present disclosure. In some embodiments, example communication technology types include LTE, 5G, 4G, and/or other suitable communication technology types.

Potential outage-causing events include events that can impact a communication site and cause a disruption to the communication service. Potential outage-causing events include natural events, such as floods, hurricanes, tornadoes, volcanic eruptions, earthquakes, tsunamis, storms, geologic processes, fires and/or other events have a potential to cause an outage at a communication site. In some embodiments, where the potential outage-causing events are weather events, the event features include a storm type. Example storm types defined by the National Weather Service include:

TSTM—thunderstorm event (light green): characterized by general or non-severe thunderstorms where a 10% or greater probability of thunderstorms is forecast;

MRGL—marginal risk event (dark green): characterized by an area of severe storms of either limited organization and longevity or very low coverage and marginal intensity;

SLGT—slight risk event (yellow) characterized by an area of organized severe storms which is not widespread in coverage with varying levels of intensity;

ENH—enhanced risk event (orange): characterized by an area of greater (relative to SLGT) severe storm coverage with varying levels of intensity;

MDT—moderate risk event (red): characterized by an area where widespread severe weather with several tornadoes and/or numerous severe thunderstorms is likely, some of which should be intense, such as supercells producing intense tornadoes and/or very large hail, or an intense squall line with widespread damaging winds; and/or HIGH—high risk event (magenta): characterized by an area where a severe weather outbreak is expected from either numerous intense and long-tracked tornadoes or a long-lived derecho-producing thunderstorm complex that produces hurricane-force wind gusts and widespread damage, reserved for a high confidence in widespread coverage of severe weather with embedded instances of extreme severe, such as violent tornadoes or very damaging convective wind events.

To train the event impact classifying engine 504, the machine learning training model 502 links an event data store including the historical event data 506 to a site outage data store including the site outage data 508 and a communication site data store including the site feature data 510 to generate a linked event impact data store. Location information about the particular potential outage-causing event, such as the boundaries of the potential outage-causing event defined by latitude and longitude values, are linked to the locations of the communication sites to determine the communication sites that were potentially affected by a particular potential outage-causing event. Event feature data, such as the potential outage-causing event type, is included in the historical event data 506. A linked data store including the event feature data and characteristics of the communication sites provided in the site feature data 510 are inputs to the training of the event impact classifying engine 504 by the machine learning training module 502. The information in the site outage data 508 provides classification labels for the impacts of the potential outage-causing events on the communications sites within the boundaries of the particular potential outage-causing events. In some embodiments, the event impact classifying engine 504 may be trained using communication site location as an input in the site features to facilitate learning specific to each communication site.

FIG. 5B illustrates an example of employing the event impact classifying engine 504 to generate event impact data. At 406, site features 512 associated with a communication site are received. In some embodiments, the site features 512 include altitude, surveyed altitude, support structure height, structure type, communication technology, site age, and/or other suitable site features, as described above. In some embodiments, the site features 512 include a location of the communication site. At 408 event features 514 associated with a potential outage-causing event are received. In some embodiments, the event features 514 are associated with a current potential outage-causing event occurring in real time or near real time. In some embodiments, the event features 514 are associated with a predicted potential outage-causing event, where the prediction window may vary from hours to days to weeks, for example.

At 410, the event impact classifying engine 504 is employed to generate an impact metric 516 indicating an effect on the communication site from the potential outage-causing event based on the site features 512 and the event features 514. In some embodiments, the event impact classifying engine 504 considers the location of the communication site in generating the impact metric 516. In some embodiments, the impact metric 516 comprises a binary value indicating if the particular communication site represented by the site features 512 is predicted to be "affected" and/or "not affected." In some embodiments, the impact metric 516 has a graded value dependent on a probability that the particular communication site represented by the site features 512 is predicted to be impacted. For example, a probability >90% may be considered a "HIGH RISK" of impact, a probability of 60%-90% may be considered a "MODERATE RISK" of impact, a probability of 40%-60% may be considered a "LOW RISK" of impact, and/or a probability of <40% may be considered a "NO RISK" of impact. Communication sites not within the boundaries of the potential outage-causing event may be considered "NO RISK" of impact. Other configurations of probability grades, such as more or less grades and different probability ranges, are within the scope of the present disclosure.

Figure 6:
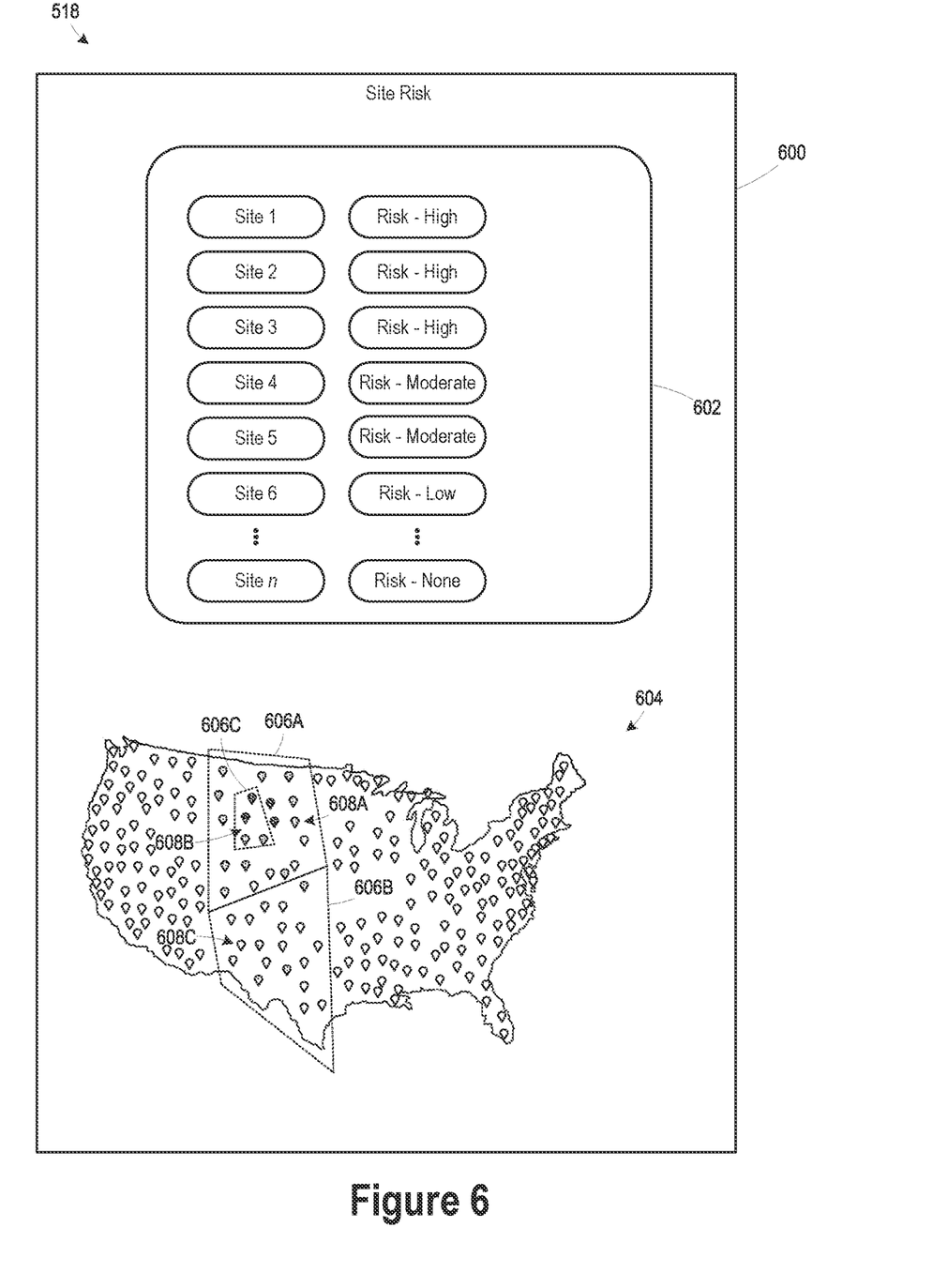
FIG. 6 is a diagram illustrating an example interface for displaying user content items.

FIG. 6 a diagram illustrating an example interface 600 for displaying user content items. At 412, an event impact report 518 is generated on the interface 600 based on the determined impact metric 516 for one or more communication sites. For example, the event impact report 518 may comprise a list 602 of communication sites predicted to be impacted during a current or future time interval. The list 602 may be ranked by risk grade, such as HIGH, MODERATE, LOW, and/or NONE. In some embodiments, the event impact report 518 comprises an event impact map 604 indicting potential outage-causing events 606A, 606B, 606C and communication sites 608A, 608B, 608C within the boundaries of the associated potential outage-causing events 606A, 606B, 606C. For example, the potential outage-causing event 606A may be an MDT event, the potential outage-causing event 606B may be a HIGH event, and the potential outage-causing event 606C may be a TSTM event. The grade associated with the impact metrics 516 may be indicated by text in the list 602 or based on coloring or shading on the event impact map 604.

In some examples, the event impact report 518 may be displayed via a client device. The event impact report 518 may be transmitted (automatically, for example) to the client device and/or displayed via the client device based upon a determination that one or more communication sites are predicted to be impacted. Alternatively and/or additionally, a notification (e.g., a warning) may be transmitted to the client device and/or displayed via the client device (in response to the determination that one or more communication sites are predicted to be impacted). In some examples, the notification may comprise the event impact report 518.

In some embodiments, the event impact report 518 provides information to network and/or engineering teams to prepare and make a plan of action and/or backup for those communication sites that are likely to be impacted by a potential outage-causing event. Proactively responding to predicted event impacts reduces the likelihood and/or duration of service interruptions, thereby increasing customer satisfaction.

According to some embodiments, resources are allocated to one or more communication sites based on the event impact report 510. In some embodiments, allocating the resources includes moving repair personnel and/or backup equipment to locations that are identified as having the highest risk and/or a level of risk that exceeds a threshold, where such a threshold might vary depending upon one or more factors, such as resources available, cost to allocate resources, predicted cost of damage, predicted duration of associated outage, predicted cost of associated outage, etc. For example, mobile COW and/or COLT units may be dispatched to high risk areas to provide backup resources to compensate for a damaged communication site.

In some embodiments, allocating the resources includes configuring the communication site based on the event impact report 510. Configuring the communication site may include changing (e.g., reinforcing) a physical structure associated with the communication site to decrease risk of damage, configuring a communication mode of the communication site (e.g., increasing or decreasing frequency, power, voltage, etc. associated with communication) to reduce the likelihood of a service disruption, enabling or disabling equipment (e.g., adding repeater, backup generator, redundant equipment, etc.) at a communication site, and/or changing another suitable communication site configuration parameter.

One or more of the techniques provided herein may be performed periodically (e.g., at least one of once per day, once per week, etc.) to generate the event impact report 518. One or more of the techniques provided herein may be performed in response to receiving a request to perform an action and/or provide a service. The action and/or the service may be associated with the event impact classifying engine 504 (e.g., the action may be performed and/or the service may be provided using the event impact classifying engine 504.

FIG. 5C illustrates an example of employing the event impact classifying engine 504 to generate a risk profile for a proposed communication site. In some embodiments, the risk profile considers potential outage-causing events 520, such as for each potential outage-causing event type described above. In some embodiments, different sets of candidate communication site feature data 522 are provided. For example, each set of candidate communication site feature data may define a different structure type for mounting the communication equipment. The event impact classifying engine 504 generates an impact metric for each combination of event feature data and communication site feature data to generate a risk profile report 524 for the various proposed designs. For example, the event impact classifying engine 504 generates a first impact metric for a particular event type and first candidate site features and the event impact classifying engine 504 generates a second impact metric for the particular event type and second candidate site features. The first impact matric and/or the second impact metric may be presented in the risk profile report 524 with a recommendation specifying one of the sets of candidate site features. Site designers may use the risk profile report 524 to select between various site construction options and/or a new communication site may be constructed based on the risk profile report 524.

At 414 the event impact classifying engine 504 is retrained. As additional data is collected for the historical event data 506 and the potential outage-causing events and the site outage data 508 is updated indicating the actual effects of potential outage-causing events on the communication sites, the machine learning training module 502 is employed to retrain the event impact classifying engine 504. In some embodiments, the retraining is performed periodically. The frequency of the retraining may vary, such as weekly, monthly, annually, or some other suitable frequency.

In some examples, one or more of the techniques provided herein may be performed within a mobile edge computing network architecture and/or a multi-access edge computing (MEC) network architecture. One or more computing programs and/or data associated with performing one or more of the techniques provided herein may be deployed at a network node, such as a cellular base station and/or a different edge node. In an example, the network node may be connected (e.g., directly connected and/or indirectly connected) to one or more devices. The network node may provide cellular coverage to the one or more devices within a coverage area of the network node. The network node may be closer to the one or more devices than a core network. At least one of training the event impact classifying engine 504, employing the event impact classifying engine 504, generating the event impact report 518, and/or generating the risk profile report 524 may be performed using a computer system at the network node. In an example, the event impact classifying engine 504 may be used by the computer system at the network node to provide one or more services to the one or more devices.

Implementation of at least some of the disclosed subject matter may lead to benefits including, but not limited to, a reduction in resources required to predict system outages and stage repair personnel. Using one or more of the techniques provided herein, the event impact classifying engine may be used to generate risk assessments for current or future potential outage-causing events or to evaluate risk profiles for proposed communication sites. Event impact reports may be generated and/or displayed automatically (such as without requiring human input, manual effort, and/or expenses associated with some systems).

In some examples, at least some of the disclosed subject matter may be implemented on a client device. In some examples, at least some of the disclosed subject matter may be implemented on a server (e.g., hosting a service accessible via a network, such as the Internet).

Figure 7:
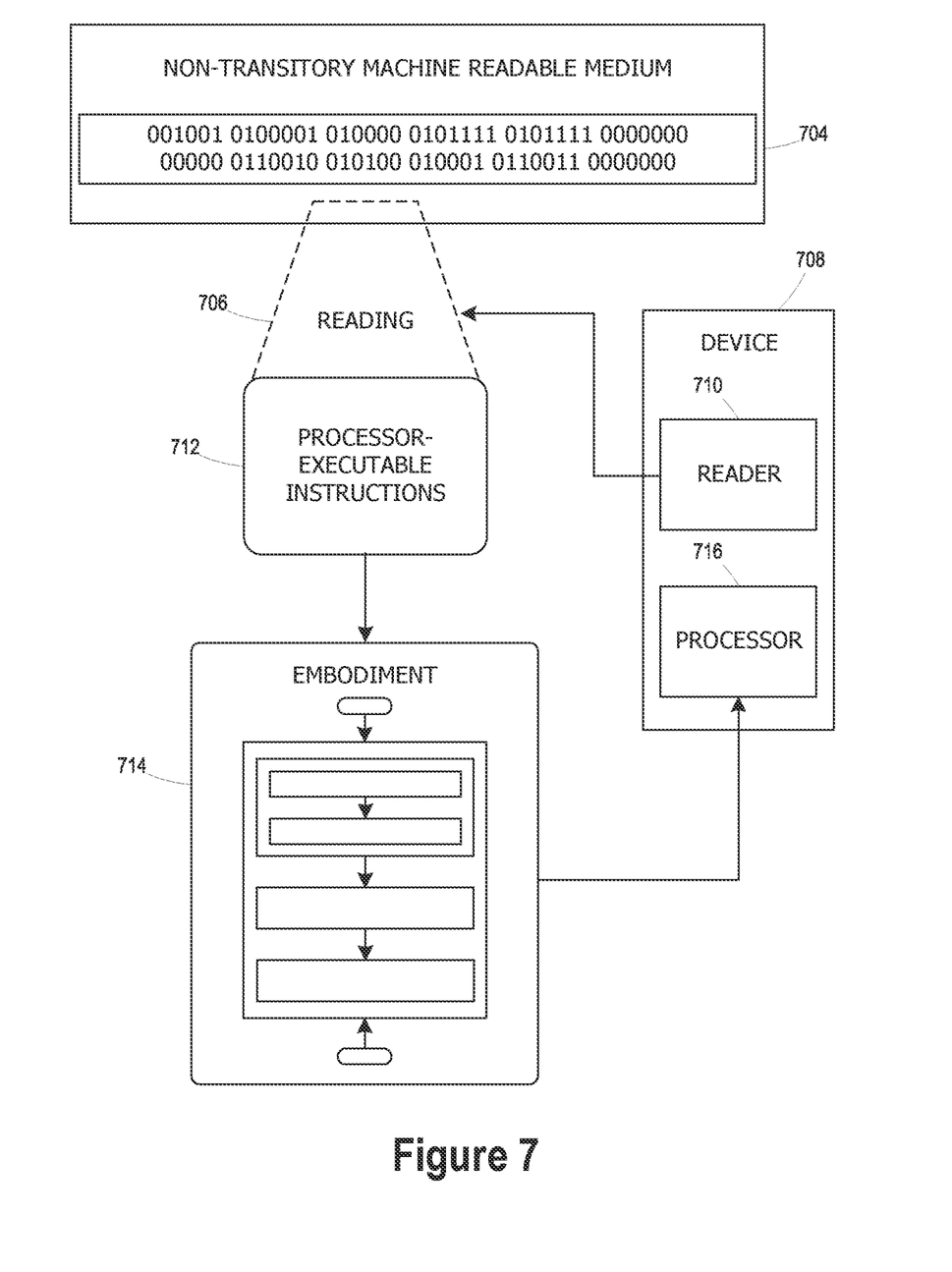
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIG. 4, for example. In some embodiments, the processor-executable instructions 712 are configured to cause implementation of a system, such as at least some of the example system 500 of FIGS. 5A-5C, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   executing, on a processor of a computing device, instructions that cause the computing device to perform operations, the operations comprising:
   receiving first site features associated with a first communication site;
   receiving second site features associated with a second communication site;
   receiving event features associated with a potential outage-causing natural event;
   employing a classifying engine to generate a first impact metric indicating an effect on the first communication site from the potential outage-causing natural event based on the first site features and the event features; and
   employing the classifying engine to generate a second impact metric indicating an effect on the second communication site from the potential outage-causing natural event based on the second site features and the event features.

2. The method of claim 1, wherein the operations comprise:
   linking a communication site data store, a site outage data store, and an event data store based on a location field to generate a linked event impact data store; and
   training the classifying engine using the linked event impact data store.

3. The method of claim 2, wherein the operations comprise:
   determining an actual effect of the potential outage-causing natural event on the first communication site; and
   after training the classifying engine, retraining the classifying engine based on the potential outage-causing natural event and the actual effect.

4. The method of claim 2, wherein:
   the location field comprises a latitude field and a longitude field.

5. The method of claim 1, wherein:
   the first site features comprise at least one of site location, altitude, support structure height, support structure type, technology type, or site age.

6. The method of claim 1, wherein:
   the event features comprise at least one of event type or event location.

7. The method of claim 1, wherein:
   the potential outage-causing natural event comprises a predicted potential outage-causing event.

8. The method of claim 1, wherein:
   the potential outage-causing natural event comprises at least one of a flood, a hurricane, a tornado, a volcanic eruption, an earthquake, a tsunami, a storm, a geologic process or a fire.

9. A computing device, comprising:
   a processor; and
   memory comprising processor-executable instructions that when executed by the processor cause performance of operations, the operations comprising:
   receiving first candidate site features associated with a communication site;
   receiving second candidate site features associated with the communication site;
   receiving first event features associated with a first potential outage-causing event;
   employing a classifying engine to generate a first impact metric indicating an effect on the communication site from the first potential outage-causing event for the first candidate site features based on the first candidate site features and the first event features; and
   employing the classifying engine to generate a second impact metric indicating an effect on the communication site from the first potential outage-causing event for the second candidate site features based on the second candidate site features and the first event features.

10. The computing device of claim 9, wherein:
    the first candidate site features comprise a first support structure field; and
    the second candidate site features comprise a second support structure field different than the first support structure field.

11. The computing device of claim 10, wherein:
    the first support structure field comprises at least one of a first support structure height or a first support structure type.

12. The computing device of claim 9, wherein the operations comprise:
    generating a recommendation selecting one of the first candidate site features or the second candidate site features based on the first impact metric and the second impact metric.

13. The computing device of claim 9, wherein:
    the first potential outage-causing event comprises at least one of a first thunderstorm event, a first marginal risk event, a first slight risk event, a first enhanced risk event, a first moderate risk event, or a first high risk event.

14. The computing device of claim 9, wherein the operations comprise:
receiving second event features associated with a second potential outage-causing event;
employing the classifying engine to generate a third impact metric indicating an effect on the communication site from the second potential outage-causing event for the first candidate site features based on the first candidate site features and the second event features;
generating a first risk profile for the first candidate site features based on the first impact metric and the third impact metric;
employing the classifying engine to generate a fourth impact metric indicating an effect on the communication site from the second potential outage-causing event for the second candidate site features based on the second candidate site features and the second event features; and
generating a second risk profile for the second candidate site features based on the second impact metric and the fourth impact metric.

15. A non-transitory machine readable medium having stored thereon processor-executable instructions that when executed cause performance of operations, the operations comprising:
receiving first site features associated with a first communication site;
receiving second site features associated with a second communication site;
receiving event features associated with a potential outage-causing event;
employing a classifying engine to generate a first impact metric indicating an effect on the first communication site from the potential outage-causing event based on the first site features and the event features;
employing the classifying engine to generate a second impact metric indicating an effect on the second communication site from the potential outage-causing event based on the second site features and the event features; and
generating a map indicating a first location of the first communication site overlaid with a first indicator corresponding to the first impact metric and indicating a second location of the second communication site overlaid with a second indicator corresponding to the second impact metric.

16. The non-transitory machine readable medium of claim 15, wherein:
the first site features comprise at least one of site location, altitude, support structure height, support structure type, technology type, or site age.

17. The non-transitory machine readable medium of claim 15, wherein:
the event features comprise at least one of event type or event location.

18. The non-transitory machine readable medium of claim 15, wherein:
the potential outage-causing event comprises a predicted potential outage-causing event.

19. The non-transitory machine readable medium of claim 15, wherein:
the potential outage-causing event comprises at least one of a thunderstorm event, a marginal risk event, a slight risk event, an enhanced risk event, a moderate risk event, or a high risk event.

20. The non-transitory machine readable medium of claim 15, wherein the operations comprise:
receiving third site features associated with a third communication site; and
responsive to determining a third location of the third communication site does not correspond to an event location associated with the potential outage-causing event, indicating on the map the third location of the third communication site overlaid with a third indicator indicating an unaffected status.

* * * * *